W. H. Haworth,
Horse-Collar Machine,
Nº 16,834. Patented Mar. 17 1857.
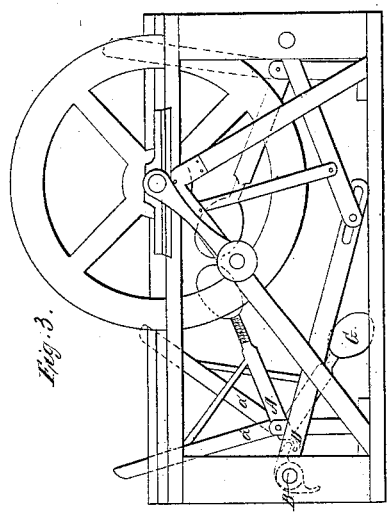
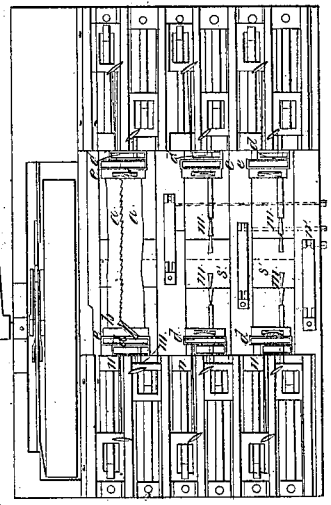
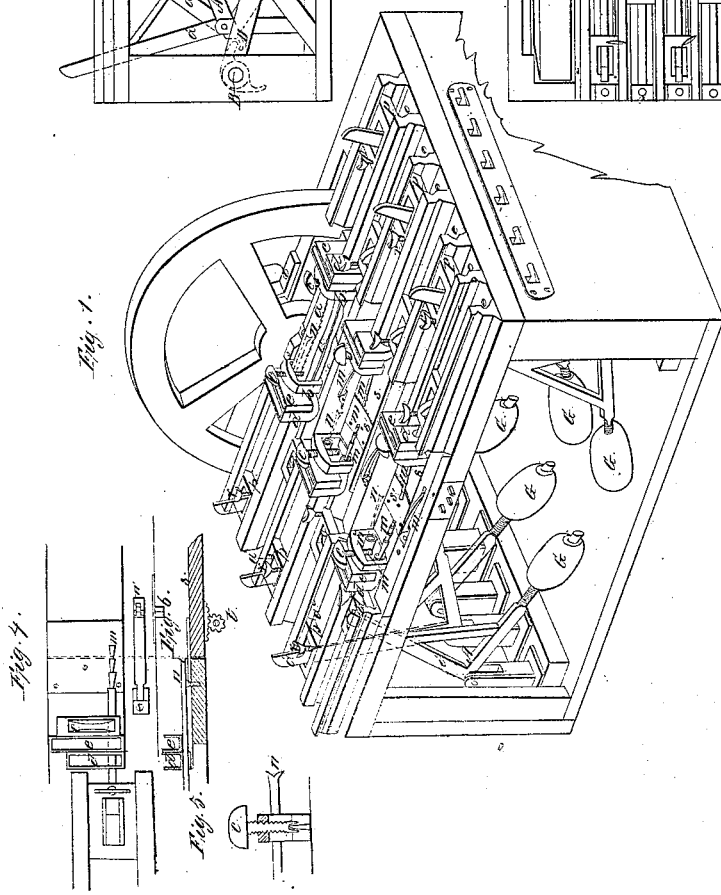
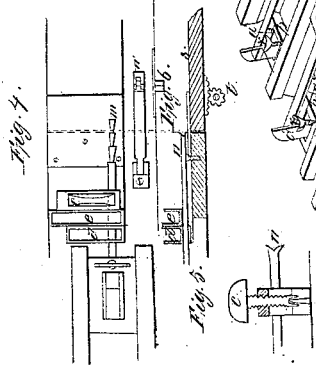
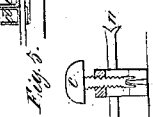

UNITED STATES PATENT OFFICE.

WADE H. HAWORTH, OF PHILADELPHIA, PENNSYLVANIA.

MACHINE FOR STUFFING HORSE-COLLARS.

Specification of Letters Patent No. 16,834, dated March 17, 1857.

*To all whom it may concern:*

Be it known that I, WADE H. HAWORTH, of Philadelphia, in the county of Philadelphia and State of Pennsylvania, have invented an Improvement in Machines for Stuffing Horse-Collars, and that the following is a full, clear, and exact description of the principle or character which distinguishes it from all other things before known and of the usual manner of making, modifying, and using the same, reference being had to the accompanying drawings, of which,—

Figure 1 is a perspective view of the machine showing its various parts and mode of operating them. Fig. 2 is a plan or top view of the same. Fig. 3 exhibits the machinery for operating the several parts. Figs. 4 and 5 are detached portions showing the mode for stretching the collars. Fig. 6 the thumb screw for confining the ends of the collar.

My invention consists in certain improvements in machines for stuffing horse collars described as follows.

Two rolls $a$, $a$ of the collar being sewed ready for stuffing are stretched between two clamps $b$, $b$ and held by means of set screws $c$ $c$ in position to receive the material for stuffing one roll being filled with cut straw or hay and the other with long straw or hay as is usual in making horse collars or stuffing them by hand. The fine cut straw is put into the box or feed hopper $d$ and the long straw into $e$. There are two stuffing rods $m$ and $n$, that for stuffing the long straw designated by $n$, shown in Fig. 6 and in dotted lines in Fig. 1 has a forked extremity and $m$ that for the fine straw having the shape generally as shown in Figs. 1, 2 and 3. These stuffers are each secured to sliding head blocks P, P, by set screws $c$ $c$ and are moved alternately back and forth by means shortly to be described. The stuffer $m$ in its back movement has its stuffing end brought within the feed box $d$ so as to push before it at each stroke through tube $m'$ the fine cut straw. The tube $m'$ is attached to box $d$ and passes under box $e$. The stuffer $n$ has its stuffing end brought within box $e$ and by means of its forked end pushes the long straw through tube $m^2$ into the roll of the collar. The open ends of the collar rolls are each secured over the ends of the tubes $m'$, $m^2$ during the operation of stuffing.

For the purpose of stretching the collar the clamps $b$, $b$, together with the boxes $d$ $e$ are secured to a sliding bed piece $s$ which is moved lengthwise the collar as follows. Beneath the table on which the collar rests, there is a shaft provided with a pinion $t$ which takes into a ratchet on the under side of piece $s$ by means of which the piece is moved out so as to stretch the collar and to keep it stretched at any desired point by means of the pawl $m^3$ which catches into a ratchet wheel $n'$ on this shaft. The space which might be left open on the table by moving out the piece $s$ is covered with a guard plate of metal.

The sliding head blocks are operated as follows. The upright arm $a'$ of bent levers A enters a slot $a^2$ in the head blocks and as this lever vibrates it carries the head block back and forth. The back and forth motions of the levers are effected by means of cams on the rock shaft B and the weights $c$ $c$ which are made adjustable so as to regulate the stuffing force. The cams strike upon projections D D on the back of the bent levers in such order as to cause the stuffing rods $m$ and $n$ to work alternately. Opposite to the stuffers just described are two corresponding stuffers having feed boxes and tubes and head blocks and actuating parts the duplicates of the above so that stuffer $m$ is met by a corresponding stuffer and so of stuffer $n$. For the purpose of expediting the operation of stuffing collars several similar machines are arranged side by side on the same table and the operating parts repeated for each.

I do not find any machine for stuffing collars, in which the stuffing rods stuff against each other from opposite ends of the collar, nor do I find any machine in which both rolls are stuffed together. In all stuffing machines previous to mine the stuffing has in fact been done by hand and not automatically as in my machine. As the hay or straw fills up the collar the stuffing rod has to recede or to "give back" as it is called and this has always been done by the hand of the operator giving less and less range of motion to the stuffing rods each time according to his judgment, as the stuffing proceeds; but with my mode of operating the stuffers by the weighted levers, the stuffers give back of themselves and stuff the collars uniformly and by making the weights adjustable the stuffing is also regulated to different qualities of stuffing material, and it will be seen also that the stuffing is made firmer toward the bulge of the collar just where it is required to be so. It is not a very difficult matter for the operator to regulate the stuffing force with a single stuffer, nor with two stuffers which act alternately as in the stuffer of W. L. Whitaker patented March the 6th, 1855, but it would be very difficult for an operator to regulate the stuffing force where two stuffers stuffed against each other as in my machine. There are two reasons why the two sets of stuffers for the two rolls of the collar should work alternately; the strain on the collar is divided and the action of the machinery is equalized.

What I claim therefore as my invention for stuffing horse collars by machinery is—

1. The employment of two stuffers, stuffing against each other from both ends of the collars when such stuffers are made to recede automatically as set forth.

2. I claim the employment of two alternating sets of such stuffers for stuffing both rolls of the collars as set forth.

WADE H. HAWORTH.

Witnesses:
CHAS. G. PAGE,
R. T. CAMPBELL.